Jan. 25, 1966 B. J. WARMAN 3,231,681

AUTOMATIC TELECOMMUNICATION SWITCHING SYSTEMS

Filed July 26, 1962 5 Sheets-Sheet 5

United States Patent Office 3,231,681

Patented Jan. 25, 1966

3,231,681

AUTOMATIC TELECOMMUNICATION SWITCHING SYSTEMS

Bloomfield James Warman, Charlton, London, England, assignor to Associated Electrical Industries Limited, London, England, a British company Filed July 26, 1962, Ser. No. 212,508
Claims priority, application Great Britain, Aug. 2, 1961, 28,097/61
2 Claims. (Cl. 179—18)

Figures 1, 2, 4:
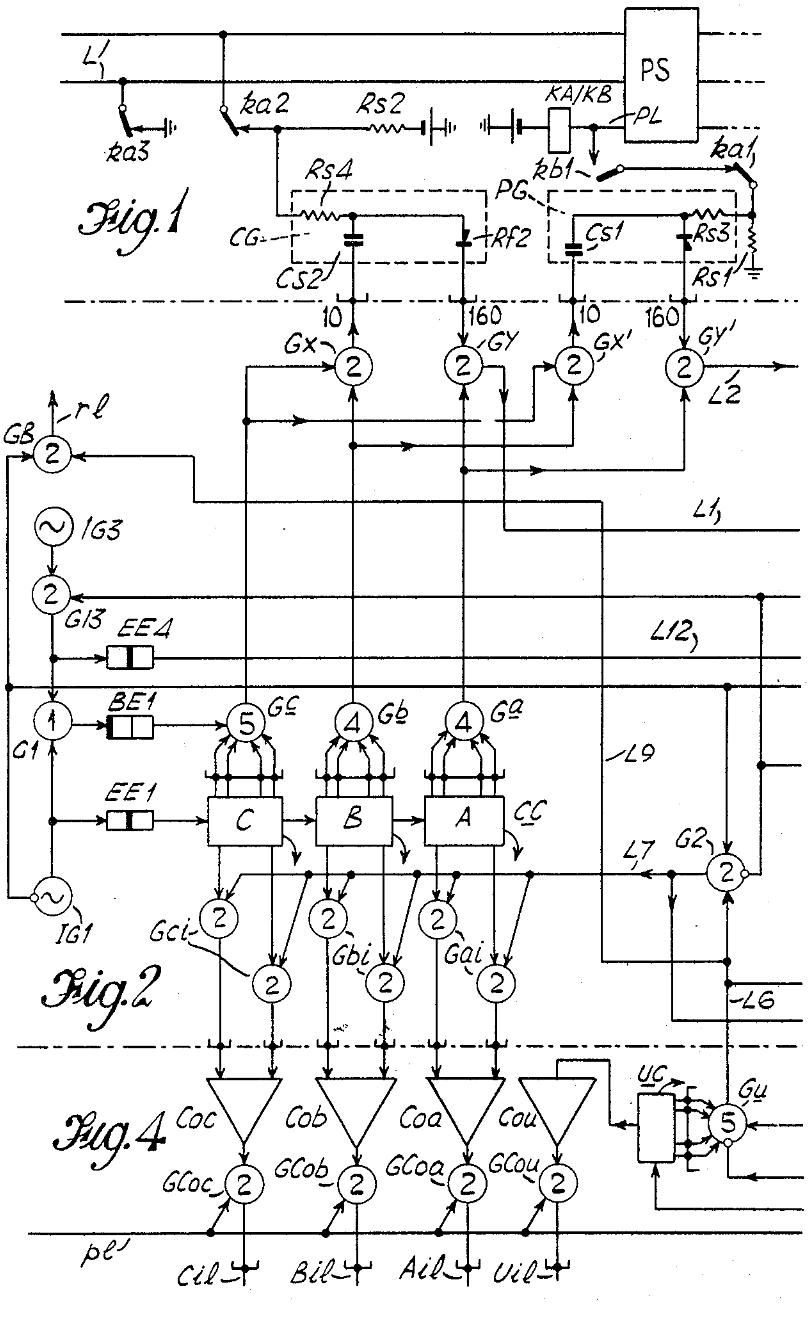

This invention relates to automatic telecommunication, especially telephone, switching systems and is particularly concerned with the line circuits for such systems.

In automatic telephone exchange switching systems, lines incoming to an exchange from subscribers' stations are normally connected to switches of a primary switching stage through which the lines are given access to other exchange apparatus by which connection towards a called line is established. Each line has its own line circuit which is operable for indicating possible line conditions that can occur; namely, whether the line is free, calling or engaged. The calling condition of a line is usually brought about by the establishment of a line loop on the line wires at the subscriber's station consequent upon the calling subscriber lifting his telephone handset. In response to the calling condition the line circuit may produce a starting potential which initiates a setting action in which a primary stage switch is taken into use and set to the line so as to connect it, possibly through set switches of one or more subsequent switching stages, to other exchange apparatus which has also been taken into use for dealing with the expected call. The line circuit may include a cut-off relay which is operated to disconnect the starting potential as a result of the setting of a primary stage switch to the calling line.

A facility often required in a telephone exchange system is that in a so-called permanent-calling or permanent-loop condition of a line an alarm should be given and/or the permanent calling condition then existing should be rendered ineffectual. A permanent-loop condition may arise in the following circumstances:

(1) When a calling condition has appeared on a line but has not been followed within a reasonable time by the impulse trains which should be received over the line by the exchange apparatus that has been seized for the expected call as a result of the calling condition;

(2) When at the end of a call the calling subscriber fails to replace his telephone handset;

(3) When at the end of a call the called subscriber does not replace his handset and does not subsequently dial within a reasonable period.

In the first of these circumstances, which may arise as a result of a fault which simulates a calling condition or of a subscriber failing to dial after lifting his telephone handset, it is clearly undesirable that the exchange apparatus which has been taken into use should thus be rendered unavailable for use on calls from other lines. Arrangements may therefore be provided by which in known manner this exchange apparatus is automatically released at the end of a timed interval from the initial appearance of the calling condition. In the second of the enumerated circumstances, assuming that the switches through which the call was established are held from the calling line, an alarm condition may be given, in response to which the seized switches can be located and forcibly released, usually manually in the case of electromechanical switches. In the third circumstance, which again assumes that the switches are held from the calling line, the seized switches would be released consequent on the replacement of the calling subscriber's telephone handset and the called subscriber's line would be left in a calling condition which would become a permanent-loop condition if this latter subscriber does not then dial within a reasonable time.

A line circuit in which the permanent calling condition arising from a permanent-loop condition is rendered ineffectual is disclosed in our copending application Serial No. 862,263, now Patent No. 3,176,078. This line circuit includes on the one hand resistances over which a calling condition on the line builds up a starting potential effective to bring about the setting of a primary switch to which the line is connected, and on the other hand a single, cut-off, relay which is connected to be operated in response to an operating condition extended thereto by a primary switch thus set, and which when operated disconnects said resistances from the line and establishes for itself a local holding circuit independent of the primary switch whereby the operating condition can be removed from the operated cut-off relay without consequent release thereof.

With this line circuit the cut-off relay is operated during the initial stages of the setting up of the call and remains operated during the call. It is released at the end of the call on the interruption of the calling loop by substituting for the operating condition initially extended to it over the primary switch a releasing condition which releases the relay, for instance by short circuit. By arranging that, when the line is in a permanent-loop condition, consequent automatic or manual release of exchange apparatus that had been taken into use has the result of removing the operating condition without replacing it by the releasing condition, the cut-off relay will remain operated in such condition so that the resistances over which the starting potential was built up are disconnected from the line and the calling condition of the line is therefore rendered ineffectual. The line is therefore locked-out of service until release of the cut-off relay is effected.

A line circuit according to the present invention again includes resistances over which a calling condition on the line builds up a starting potential for initiating the setting of a primary switch to which the line is connected, but in contrast to the line circuit disclosed in our said copending application it includes a two-step cut-off relay having a fully operated condition in which all its contacts are operated, a fully released condition in which all its contacts are released, and a partially operated, or released, condition in which only some of its contacts are operated. This cut-off relay is connected on the one hand to be fully operated in response to an operating condition extended thereto by a primary switch thus set, being effective when fully operated to disconnect said resistances from the line and to prepare for itself a local holding circuit independent of the primary switch, and on the other hand to be fully released by a releasing condition extended to it from the primary switch in place of the operating condition, the arrangement being such that removal of the operating condition without replacement by the releasing condition, for example in response to a permanent-calling condition of the line, causes only partial release of the relay, the relay being effective, in this partially released condition, to reconnect said resistances to the line, to complete for itself said holding circuit which maintains the relay partially released, and to cause the production of a second potential, additional to the starting potential, indicating that the permanent-calling condition which causes the partial release has occurred.

With the line circuit of the present invention the cut-off relay, thus fully operated during the initial stages of the setting up of a call, would remain fully operated during the call and would be fully released at the end of the call by substituting the releasing condition for the operating condition, the releasing condition conveniently being a short-circuit. By arranging that, when the line is in a permanent-loop condition, any automatic or manual release of the exchange apparatus that had been taken into use for an expected call which did not materialise has the results of removing the operating condition without replacing it by the releasing condition, the cut-off relay will only partially release and the consequent production of the second potential referred to serves to indicate that a permanent-calling condition of the line has occurred. If the permanent-calling condition still persists the starting potential will also again be produced by the line circuit by reason of the reconnection of the resistances to the line in the partially released condition of the cut-off relay.

The line circuit of the present invention thus produces the starting potential alone for a normal calling condition, said second potential alone for a permanent-calling condition which had occurred but which is no longer present, and both of these potentials together for a permanent-calling condition which still persists, either not having been cleared or having been cleared but revived by a subsequently occurring calling condition.

By virtue of these distinctive potentials indicative of the different conditions of a line, line circuits conforming to the invention permit the employment in an automatic telephone exchange system of a single scanning arrangement which is effective for detecting both a normal calling condition and a permanent-calling condition of lines. It is envisaged that in conjunction with such a scanning circuit arrangement there would further be included in each line circuit a pair of coincidence gates to which said potentials as produced by the line circuit are respectively applied as priming signals. These pairs of coincidence gates would be interrogated in turn by interrogating, or opening, signals applied concurrently to the two gates of each pair by the scanning circuit arrangement, the coincidence at either gate of a pair of a priming signal and an opening signal causing the gate to produce an output signal signifying a detected line. In response to an output signal from either gate alone of a pair the scanning circuit arrangement would provide marking signals which identify the line thus detected and also indicate, in dependence on which gate of the pair produces the output signal, the condition (normal calling or cleared permanent calling) present on that line. In the case of a normal calling condition exchange apparatus may then be operable in response to such marking signals, and a signal indicating the normal calling condition, to cause the detected line to be set to by a primary switch for the establishment of a call. An operating condition would then be extended through the primary switch from the exchange apparatus to fully operate the cut-off relay and thereby busy the line. In the case of a permanent-calling condition, indicating that the line is effectively locked out of service, exchange apparatus may likewise be operable in response to the marking signals, and a signal indicating the permanent-calling condition, to cause the detected line to be set to by a primary switch, and the set primary switch, in the absence of the calling loop, to produce the releasing condition which causes the release of the cut-off relay from its partially operated, or released, condition whereby to restore the line to service.

It will be evident that if a pair of gates of a line circuit being interrogated by the scanning circuit arrangement both produce output signals the line is in a persisting permanent-calling condition and should not be restored to service. The scanning circuit arrangement may therefore further include inhibiting gating means responsive to output signals from both gates of a pair to prevent the scanning circuit arrangement from producing in respect of such line marking signals to which the exchange apparatus referred to can respond either to indicate the setting up of a call or to apply the releasing condition. The line therefore remains effectively locked-out of service and will remain so until the calling condition has been removed.

The two-step cut-off relay employed in a line circuit conforming to the invention may have two separate armatuer portions controlling respective contacts, its fully operated condition being when both armature portions thereof are actuated, its fully released condition being when both armature portions thereof are restored, or unactuated, and its partially operated, or released, condition being when one of its armature portions remains actuated while the other armature portion restores. An example of a suitable two-step relay provided with two separate armature portions both pivoted on the same yoke and acted upon by the same operating coil is given in British patent specification No. 483,525.

Figures 2A, 4A:
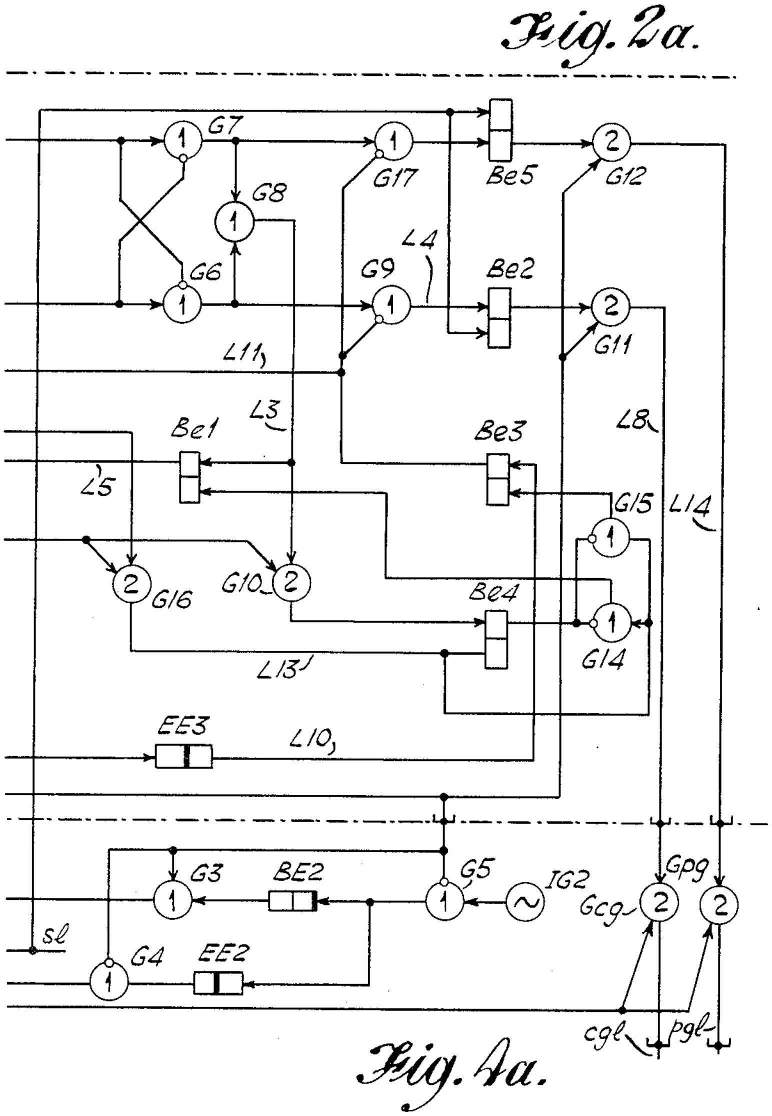
Figure 3:
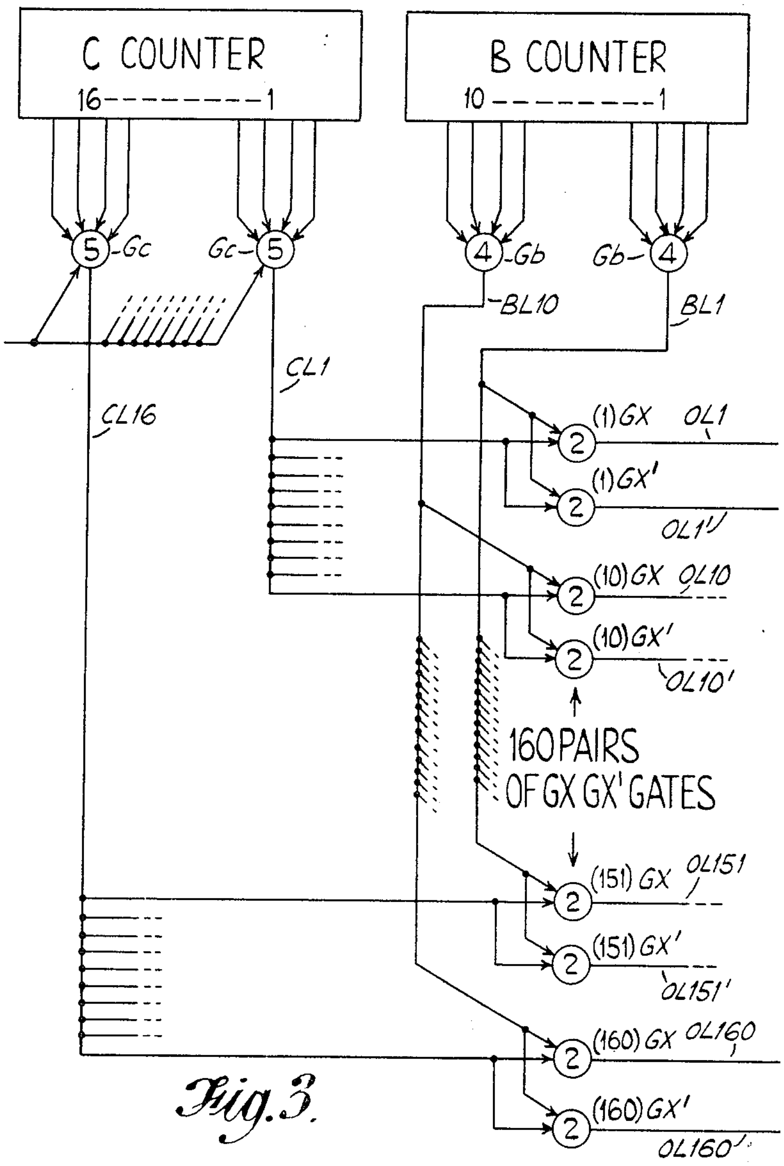
Figure 3A:
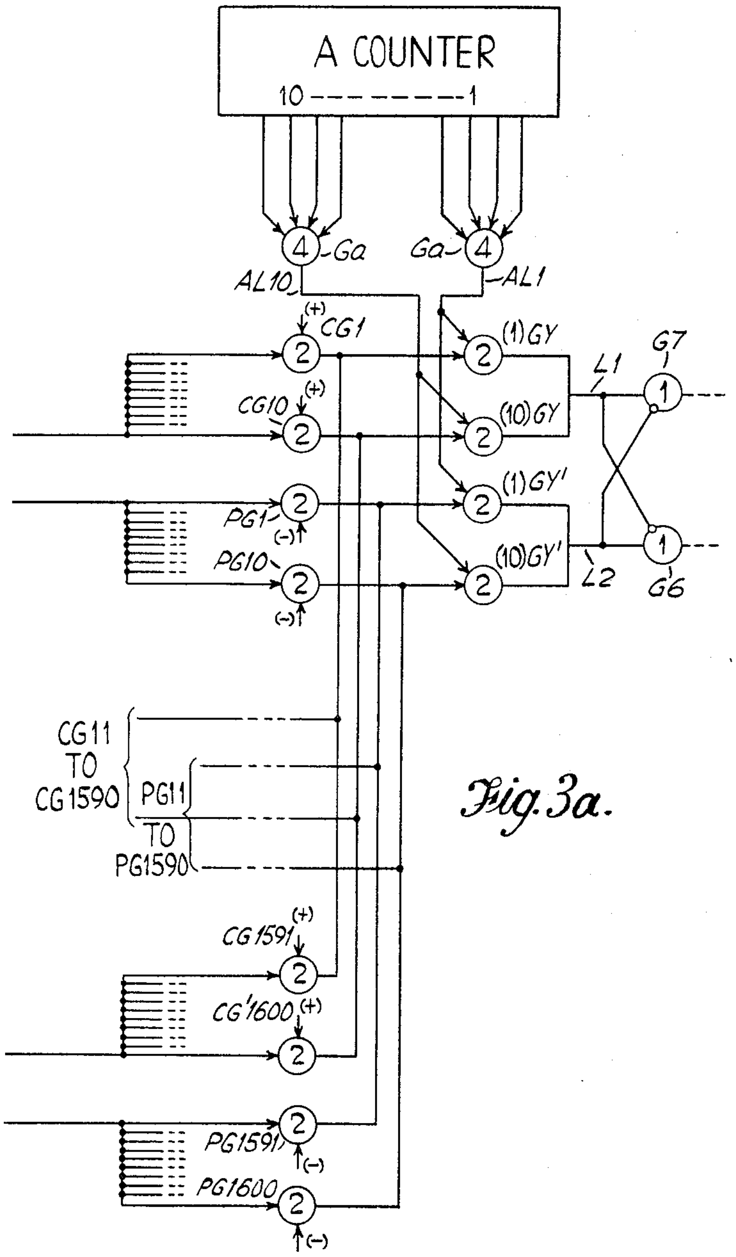
Figure 5:
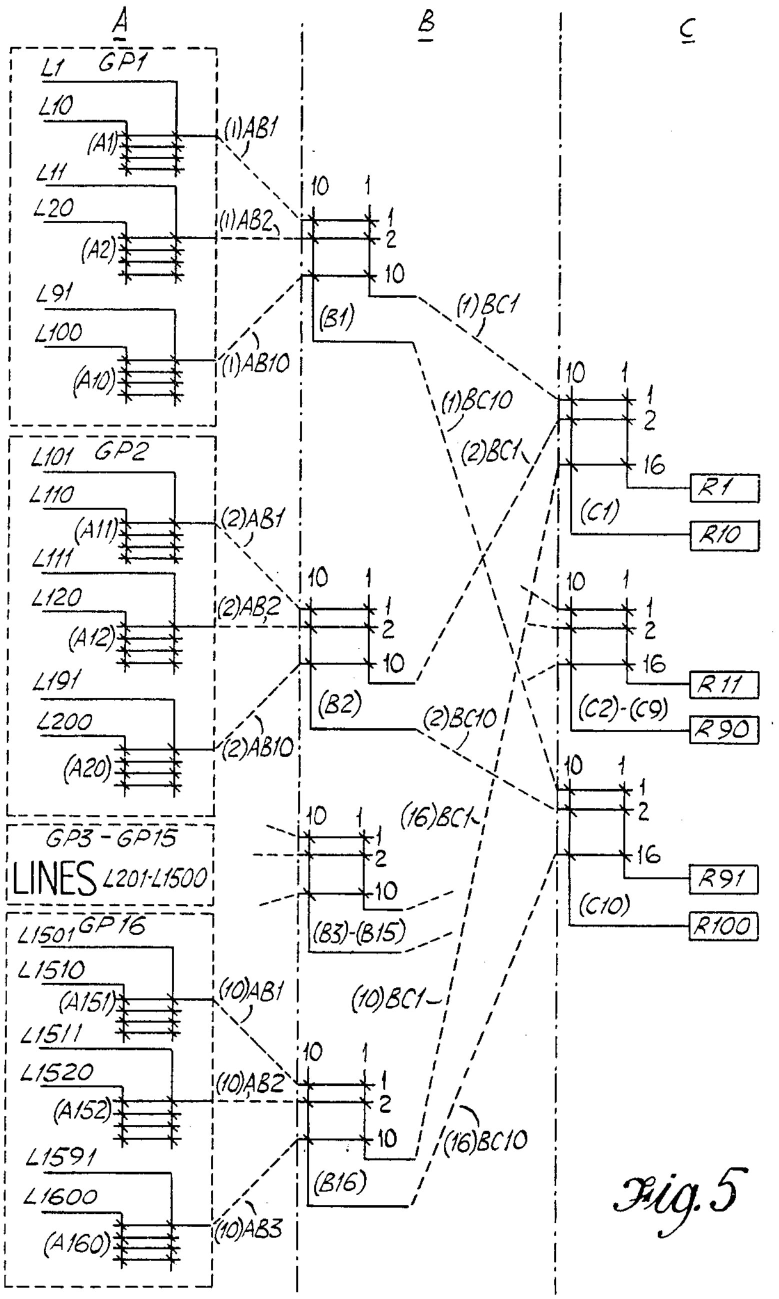

In order that the invention may be more fully understood reference will now be made by way of example to the accompanying drawings in which:

FIG. 1 shows a line circuit conforming to the invention;

FIGS. 2 and 2*a* together show in schematic form, with FIG. 2 placed to the left of FIG. 2*a*, a scanning circuit arrangement for detecting both the calling and permanent loop conditions of line circuits such as that shown in FIG. 1;

FIGS. 3 and 3*a* together show in schematic form, with FIG. 3 placed to the left of FIG. 3*a*, the organization of a pulse distributing circuit and coincidence gates therefor as employed in the arrangement of FIGS. 2 and 2*a*;

FIGS. 4 and 4*a* together show in schematic form, with FIG. 4 placed to the left of FIG. 4*a*, identification coding elements which are employed in conjunction with the arrangement of FIGS. 2 and 2*a*; and FIG. 5 illustrates in diagrammatic form certain switching ranks of an automatic exchange system in which the invention may be employed.

Referring to FIG. 1, the line circuit conforming to the invention there shown is assumed to be one of, say, ten thousand such line circuits respectively associated with subscribers' lines connected to an automatic telephone exchange. Line wires such as L of each subscriber's line are extended through the relevant line circuit to primary switches, represented by the block PS, of a primary switching stage through which the subscribers' lines are given access to further exchange apparatus (not shown) for the setting up of connections through the exchange. The switches such as switch PS may be electromechanical switches such as two-motion switches, uniselector switches or cross-bar switches, or electronic switches serving an analogous function, or they may be cross-point switches in which the switching is effected by means of so-called reed relays at the cross-points. Each line circuit also has an individual control or private P-wire such as PL extending to it from the primary switching stage. In accordance with usual practice this P-wire will be marked with earth potential to indicate a busy condition of a primary stage switch which has set to the line, and thus the busy condition of the line as well.

The line circuit for each subscriber's line includes a cut-off relay KA/KB the armature of which comprises two separate portions: one such armature portion controls three normally-closed contacts *ka*1, *ka*2 and *ka*3, while the other controls a single normally-open contact *kb*1. This relay KA/KB is connected between the P-wire PL and an earthed negative battery and will therefore be fully operated (that is, both armature portions thereof are actuated) between the negative battery and earth when a busying earth is applied to the P-wire PL from a primary stage switch which has set to the line circuit. The normally-open contact *kb*1 of relay KA/KB is connected between the P-wire PL and an earthed resistance R*s*1, closure of this contact *kb*1 on operation of the relay KA/KB being therefore effective to prepare through this resistance R*s*1 a local holding circuit which is independent of the primary stage switch such as PS. However, this local holding circuit is completed, as will be described, only when the normally-closed contact *ka*1 of relay KA/KB is in its unoperated condition. The line circuit also includes a resistance R*s*2 which is connected between one of the line wires L and earthed negative battery through the normally-closed contact *ka*2 of the cut-off relay KA/KB. The normally-closed contact *ka*3 of relay KA/KB is connected between the other of the line wires L and earth. The junction of resistance R*s*1 and contact *ka*1 is connected to one side of a resistance R*s*3, to the other side of which is connected a capacitor C*s*1 and a rectifier R*f*1, the latter being poled to conduct towards the resistance R*s*3. Similarly, the junction of resistance R*s*2 and contact *ka*2 is connected to one side of a further resistance R*s*4, to the otherside of which is connected a capacitor C*s*2 and a rectifier R*f*2: in this instance the rectifier R*f*2 is poled to conduct away from the resistance R*s*4. The resistance R*s*3, capacitor C*s*1 and rectifier R*f*1 together form a first pulse-plus-bias gate PG for providing a signal indicating that the line circuit is in a permanent-loop condition while the resistance R*s*4, capacitor C*s*2 and rectifier R*f*2 together form a second pulse-plus-bias gate CG for providing a signal indicating that the line circuit has its line wires L looped.

Considering now the operation of the line circuit of FIG. 1, the cut-off relay KA/KB is normally fully released (that is, both armature portions thereof are restored) so that its contact *ka*2 connects the resistance R*s*2 to one of the line wires L and its contact *ka*3 earths the other line wire. When the subscriber lifts his telephone handset and thereby loops the line L, current flows through the resistance R*s*2 *via* the line loop and establishes a positive (earth) starting potential at the junction of resistances R*s*2 and R*s*4. In a manner to be described later, the scanning circuit arrangement of FIG. 2–2*a* detects this starting potential through the medium of the gate CG and in response to it extends to exchange apparatus (not shown) marking signals which identify the line and also indicate that the line is in a calling condition. As a consequence of these marking signals the exchange apparatus causes a primary stage switch, such as switch PS, to set to the calling line, the manner in which this is achieved depending on the type of exchange switching apparatus employed and not forming part of the present invention. When the primary switch has set a busying earth applied from it to the P-wire PL causes the cut-off relay KA/KB to fully operate (that is, both armature portions thereof are actuated). The operated cut-off relay KA/KB disconnects the resistance R*s*2 and earth from the calling line at contacts *ka*2 and *ka*3, thus removing the starting potential. Dialing tone is thereafter reverted to the calling line and digit impulse trains subsequently received from the line are utilized for setting up a call towards a called line, these functions being carried out in any suitable manner which is no concern of the present invention. The cut-off relay KA/KB remains fully operated for the duration of the call by the busying earth and is fully released at the end of the call when the calling loop is interrupted by a negative potential which replaces the busying earth on the P-wire PL and thus short-circuits the cut-off relay KA/KB. During the foregoing circuit operation for a normal calling condition the previously referred to holding circuit for the cut-off relay KA/KB is not ompleted because when this relay is fully released contact *kb*1 is open, and when it is fully operated contact *ka*1 is open.

If a subscriber initiates a call on the line L by lifting his telephone handset, but then fails to dial, the scanning circuit arrangement of FIG. 2–2*a* will nevertheless detect the calling condition of the line and cause a primary stage switch, such as switch PS, to set to it as before. As is common practice, on failure of digit impulse trains to arrive within a certain time from the calling line, exchange apparatus taken into use for the expected call will release itself and clear down all seized switches including the primary stage switch. With this primary stage switch no longer set to the calling line, the busying earth potential extended over the P-wire PL to the operated cutoff relay KA/KB will be removed, but without replacing it by the negative potential, which is normally produced at the end of a completed call, because the calling loop is still present. The cut-off relay KA/KB will thereupon commence to release and as it does so the armature portion controlling contacts *ka*1 to *ka*3, being the more heavily loaded, will restore before the other armature portion contolling only the contact *kb*1 commences to restore. As a consequence, contact *kb*1 will still be closed when contact *ka*1 recloses so that the holding circuit for relay KA/KB is completed. The cut-off relay KA/KB will therefore be held in a partially released condition (that is, with its armature portion controlling contact *kb*1 still actuated, but with its armature portion controlling contacts *ka*1 to *ka*3 restored) by current flow in the holding circuit, such current flow being insufficient to cause the relay to fully re-operate.

It will be appreciated that under a normal, short-circuit release condition as described earlier, the holding circuit would also have been completed momentarily in the same manner, but the continued presence of the negative potential on the P-wire PL in such release condition renders the holding circuit ineffectual.

As a result of the current flow in the holding circuit there exists at the junction of resistances R*s*1 and R*s*3, and thus on the P-wire PL an effective busying potential for the line circuit, while at the other side of the resistance R*s*3 there exists a negative potential which the scanning circuit arrangement can detect, as will be described, through the medium of the gate PG. The line circuit is therefore now in a permanent-loop lock-out condition as signified by such negative potential: if the permanent-calling condition causing the lock-out condition is still present on the line L then, additionally, this will be signified by the starting potential which has reappeared due to the re-closure of the cut-off relay contacts *ka*2 and *ka*3.

Turning now to the scanning circuit arrangement shown schematically in FIG. 2–2*a*, this arrangement includes a pulse distributing circuit CC which, in conjunction with a plurality of pairs of combining gates such as GX, GY and GX′, GY′, produces scanning pulses for interrogating in turn the pairs of gates such as CG and PG of the line circuits. By way of example and in accordance with a particular contemplated application of the invention the circuit CC comprises three cascade-connected cylically-operable counter stages A, B and C of which the stage C is driven by pulses produced by an impulse generator IG1, the stage B is stepped one step for each cycle of the stage C, and the stage A is stepped one step for each cycle of the stage B. Each of the three counter stages A, B and C is assumed to be made up of a number of bistable elements providing a unique combination of binary marking signals for each possible count, or setting, which the stage can have, and each has associated with it a plurality of coincidence gates, such as gate G*c*, G*b* or G*a*, by which the different combinations of marking signals are converted into respective single output signals. Thus if, for example, the counter stage C is required to provide an output signal on each of sixteen separate output leads in turn during a cycle of operation, this counter stage may conveniently comprise four bistable elements which are interconnected for operation in usual binary fashion to provide a recurrent count of sixteen in response to applied pulses, and there may be associated with the counter stage sixteen coincidence gates such as gate G*c* which serve to convert the sixteen different possible combinations of binary marking signals respectively produced during the cycle of operation of the counter stage into respective single output signals which appear in turn from these coincidence gates on individual output leads. If, on the other hand, each of the counter stages B and A is required to provide an output signal on each of only ten separate output leads in turn they may likewise each comprise four bistable elements, but which have interconnections between them appropriate for their providing a recurrent count of only ten, instead of sixteen, in response to applied pulses. In this latter instance ten coincidence gates such as gate G*b*, and ten coincidence gates such as gate G*a*, would be provided for converting into respective single output signals the ten different combinations of binary marking signals produced per cycle of the counter stages B and A respectively.

The manner in which the output signals from the counter stages C, B and A are combined by means of the pairs of gates GX, GY and GX′, GY′ to produce scanning pulses will be dealt with later with reference to FIG. 3–3*a*. All that need be understood at present in this respect is that when a line circuit such as the line circuit of FIG. 1 is interrogated scanning pulses are applied coincidently to its gates CG and PG from combining gates such as GX and GX′, and further combining gates such as GY and GY′ are open to pass a signal which is produced by the line circuit if its line is in a calling condition or a permanent-loop condition.

The impulse generator IG1 is suitably a free-running oscillator operating at 10 Kc./s., and the pulses produced thereby for driving the pulse-distributing circuit CC are applied to an end element EE1 which is effective for applying a pulse to the counter stage C only on the termination of each driving pulse. The driving pulses are also applied through a gate G1 to a beginning element BE1 which is effective for applying, at the commencement only of each driving pulse, a pulse to the coincidence gates such as gate G*c* associated with the counter stage C. Thus the counter stage C is stepped one step at the end of each driving pulse but no output signal is produced from the coincidence gate such as gate G*c* then receiving the combination of binary marking signals from the counter stage C until the beginning of the next driving pulse. This allows time for the bistable elements of the counter stage C to become stabilised following any turnover thereof before the relevant coincidence gate such as G*c* is opened to produce an output signal in correspondence with the combination of marking signals then obtaining. In addition to the combinations of binary marking signals each of the counter stages A, B and C also produces a unique combination of binary identification signals for each different setting, or count, thereof. These combinations of binary identification signals are applied to coincidence gates such as gates G*ci*, G*bi* and G*ai*, as the case may be, which when open pass the signals to respective converter circuits C*oc*, C*ob* and C*oa* (FIG. 4) which convert the combinations of binary identification signals into respective combinations of line circuit identificaton signals. Conveniently, the converter circuits C*ob* and C*oa* may be 2-out-of-5 converters, that is, for each received combination of binary signals they provide identification signals on a particular two of five output leads, while the converter circuit C*oc* may be a 2-out-of-7 converter, that is, it provides identification signals on a particular two of seven output leads for each received combination of binary signals. The identification signals produced by the converters C*oc*, C*ob* and C*oa* are applied to individual gates such as gates GC*oc*, GB*ob* and GC*oa* which when open pass these signals over leads such as leads C*il*, B*il* and A*il* to other exchange equipment (not shown) which can cause a line circuit thus identified by the identification signals to be set to.

In the case of a large telephone exchange, there may be several scanning circuit arrangements, such as shown in FIG. 3–3*a*, which serve respective numbers of line circuits. To cater for this possibility there is also shown in FIG. 4–4*a* an auxiliary pulse-distributing circuit UC which produces pulses for allowing each such scanning circuit arrangement to have access to said other exchange equipment when required for passing thereto the identification signals of a detected line circuit.

Suitably, the circuit UC may be of the same form as the counter stage A or B, being provided with a plurality of coincidence gates such as gate G*u* by which its different combinations of binary marking signals are converted into respective single output signals which are fed to repsective gates, such as gate G2, in the relevant scanning circuit arrangement. The counter UC is driven by pulses produced by a second impulse generator IG2 which may be of the same form as the impulse generator IG1 and may produce pulses at the same repetition frequency as it. Associated with the impulse generator IG2 is a beginning element BE2 and an end element EE2 which function in the same fashion as the elements BE1 and EE1 for controlling the application of the driving pulses to the circuit UC and to its associated gates such as gate G*u*. Connected in circuit between the impulse generator IG2 and the circuit UC are three gates G3, G4 and G5, the latter two being inhibiting gates, the functions of which will be dealt with later. Also associated with the circuit UC is a converter C*ou* which converts binary identification signals produced by the circuit CC into scanning circuit identification signals, these latter signals being coded in a 2-out-of-5 basis in the same manner as the identification signals produced by the converter C*oa* or C*ob*. The scanning circuit identification signals are applied to coincidence gates such as gate GC*ou* which when open pass these signals over leads such as lead U*il* to said further exchange equipment to give the identity of the particular scanning circuit arrangement concerned.

Considering now the operation of the scanning circuit arrangement upon detecting a line circuit, assumed to be the one shown in FIG. 1, which has a calling loop across its line L. With the calling loop present the calling gate CG is biased open by the positive potential built-up across the resistance R*s*2 so that a positive-going pulse applied from the relevant gate such as gate GX to capacitor C*s*2 will pass through the gate CG and leave it *via* rectifier R*f*2, to be applied to the relevant gate such as gate GY. This latter gate is opened by a signal applied to it from the counter stage A and therefore in response to the pulse from the calling gate CG will produce a signal which is applied over a lead L1 as an input signal to a gate G6 and as an inhibiting signal to a gate G7. The gate G6 passes this signal to two further gates G8 and G9 of which, gate G8 in turn passes the signal over a lead L3 to set a bistable element B*e*1 and also to prime a further coincidence gate G10, while gate G9 in turn passes the signal over a lead L4 to set a bistable element B*e*2. When the bistable element B*e*1 sets it applies over a lead L5 a signal which inhibits the operation of the impulse generator IG1 so that the pulse distributing circuit CC is halted at a setting corresponding to the detected line circuit. The signal on the lead L5 is also applied as a priming signal to the coincidence gate G2 which then opens upon receiving a signal over a lead L6 from the gate G*u* to produce on a lead L7 a signal which opens the gates such as gates G*ci*, G*bi* and G*ai*, whereby the identification signals applied to these latter gates from the counter CC pass to the converters C*oc*, C*ob* and C*oa*. The signal on the lead L7 is also applied on the one hand as an inhibiting signal to gates G4 and G5 whereby to prevent further stepping of the counter UC by driving pulses from the impulse generator IG2, and on the other hand as an opening signal to two further coincidence gates G11 and G12. Gate G11 is already receiving a signal from the set bistable element B*e*2 and therefore opens to produce on a lead L8 a signal which is applied to a gate G*cg*. The signal on lead L7 is also applied through gate G3 to maintain the gate G*u* open. The signal on the lead L5 together with a signal on a lead L9 as extended from the lead L6 are applied coincidently to a further coincidence gate G13 which thereupon produces on a lead *rl* a signal indicative of the expected call, the presence of this signal causing the exchange apparatus to return over a lead *pl* a signal which is applied in common to the gates such as GC*oc*, GC*ob*, GC*oa*, GC*ou* and to gate G*cg*. The relevant ones of these gates thereupon open to pass the identity of the detected line, together with a signal on a lead *cgl*, from gate G*cg*, indicating that the detected line is in a calling condition. Upon receipt of this information by the exchange apparatus, a primary stage switch such as switch PS is set to the calling line and there is applied to a "step-on" lead *sl* a signal which inhibits the gate G*u* and resets the bistable element B*e*2. With gate G*u* inhibited gate G2 closes thereby closing gates G*ci*, G*bi*, G*ai* and G11 so removing the identification signals on the leads C*il*, B*il*, A*il* and *cgl*. The inhibiting signals are also removed from gates G4 and G5 so that the scanning action of the counter UC recommences, but with gate G*u* continued to be inhibited so that the scanning circuit arrangement cannot be re-engaged.

When the signal is removed from the lead L6 as a consequence of gate G*u* becoming inhibited, an end element EE3 produces on a lead L10 a signal which sets a further bistable element B*e*3. Upon setting, this element B*e*3 produces a signal which on the one hand is applied as an inhibiting signal to gate G9 and on the other hand is applied over a lead L11 to inhibit gate G2 and to prime a further gate G13'. This gate G13' is continuously receiving pulses from a third impulse generator IG3, which is a comparatively slow-running oscillator producing pulses at, say, 100 cycles per second, and therefore opens to the first pulse which it receives after being primed to pass a pulse to a further end element EE4 and also through gate G1 to the beginning element BE1. The pulse from the beginning element BE1 passes through the opened gates G*c*, GX, CG and GY to lead L1, and through gates G6 and G8 to gate G10 which, being opened by the signal from the set bistable element B*e*3, passes a signal which sets a further bistable element B*e*4. The output signal produced by the set bistable element B*e*4 inhibits two further gates G14 and G15. At the termination of the pulse from the impulse generator IG3 the end element EE4 applies a signal to a further gate G16 over a lead L12. This gate is already primed by the signal on lead L11 from the bistable element B*e*3 and therefore opens to produce on a lead L13 a signal which is prevented from passing through the gates G14 and G15 because of the inhibiting signal applied thereto but which resets the bistable element B*e*4. This action is repeated for each subsequent pulse produced by the impulse generator IG3 until the calling line circuit is set to by a primary stage switch such as switch PS. The relay KA/KB is then operated by a busying earth applied from the set primary switch to the P-wire PL and opens its contacts *ka*2 and *ka*3. This disconnects the resistance R*s*2 from the line L so that the calling gate CG becomes closed. As a consequence, the next pulse from the beginning element BE1 is prevented from reaching the bistable element B*e*4 so that the next end signal from the end element EE4 passes through gates G14 and G15, now uninhibited, to reset the bistable elements B*e*1 and B*e*3. Upon resetting, the bistable element B*e*1 removes the inhibiting signal applied to the impulse generator IG1, thereby allowing the scanning action to restart, while the bistable element B*e*3 removes the inhibiting signal from gates G2 and G9 and the priming signals from gates G10, G16 and G13. The scanning circuit arrangement is now restored to its original condition for further scanning of the line circuits.

The operation of the scanning circuit arrangement upon detecting a line circuit which is in a permanent-loop condition depends on whether or not there is also a calling condition on the line. If there is no calling condition then the operation is similar to that just described and will therefore be dealt with only briefly. In the permanent-loop condition of the line circuit of FIG. 1 the gate PG is biased open by the negative potential built up across resistance R*s*3 and therefore upon receipt of a pulse from the relevant gate such as gate GX', the gate PG passes a pulse to gate GY'. This latter gate, being open, applies a signal over a lead L2 to gate G7, which in turn passes the signal to gate G8 and to a further gate G17. The output from the gate G17 sets a bistable element B*e*5 which upon setting primes a coincidence gate G12. The output signal from gate G8 is effective in the same manner as for a calling condition to bring about the above described circuit operations of the scanning circuit arrangement, the only difference being that gate G12 is the one open to pass over a lead L14 a signal to a gate G*pg* which in turn is opened to pass the signal over a lead *pgl*. The setting of a primary stage switch to the line is as for a normal call, and since there is no calling loop on the line there is extended from the switch to the cut-off relay KA/KB in the line circuit the negative releasing condition, whereby to restore the line circuit to service. In view of the fact that the operation is the same for a signal on either of the leads *pgl* and *cgl*, these leads may be combined into a single lead for both the normal calling signal and the permanent-loop calling signal.

However, if a line circuit is detected which has both its gates such as gates CG and PG open, thereby signifying that the line is in a permanent-loop condition and that there is still a loop across the line L, then signals appear on both leads L1 and L2; these signals cross inhibit gate G6 or G7, as the case may be, so that there is no output to gate G8 and therefore no operation of the scanning circuit arrangement as for a detected line. Such a line circuit therefore remains unresponded to until the loop on its line wires is cleared. If the line circuit were restored to service while the loop is still present, it would be immediately set to again and then revert to a permanent-loop condition after a short period. This would be a wasteful usage of the switching mechanism of the exchange which the present invention avoids.

Turning now to FIGS. 3–3*a* which shows, by way of example, a contemplated form of the pulse distributing circuit CC. In this form the circuit CC has facility for scanning 1600 line circuits in turn, to which end it is arranged as follows. The counter stage C has associated with it sixteen coincidence gates G*c* which provide respective output signals in turn on individual output leads CL1–CL16 according to the setting of the counter stage C at any time, while each of the two counter stages B and A has associated with it ten coincidence gates (G*b* or G*a*) which likewise provide respective output signals in turn on individual output leads BL1–BL10 or AL1–AL10 according to the counter settings. The sixteen output leads CL1–CL16 and the ten output leads BL1–BL10 are combined matrix-wise, or co-ordinately, to serve as input leads for 160 pairs of coincidence gates (1)GX, (1)GX' . . . (160)GX, (160)GX', each such pair of gates corresponding to the pair of coincidence gates GX, GX' in FIG. 2. Thus for each combined setting of the two counter stages C and B a particular pair of these GX, GX' gates are receiving coincidence signals over the relevant two counter output leads and are therefore open to pass an output signal on an individual pair of output leads OL1, OL1' . . . or OL160, OL160' as the case may be. The 160 output leads OL1–OL160 are connected to respective groups of ten line circuit calling gates CG1–CG10 . . . CG1591–CG1600 and the 160 output leads OL1'–OL160' are connected to respective groups of ten line circuit permanent-loop condition gates PG1–PG10 . . . PG1591–PG1600. Each pair of these CG and PG gates corresponds to the pair of gates CG and PG shown in FIG. 1; between FIG. 1 and FIG. 2 the two common symbols (10) denote the common connection of the outputs from the gates GX and GX' to ten gates CG and ten gates PG respectively. The other inputs to the (CG) gates are the positive potentials (+) applied thereto from the relevant line circuit when it is in a calling condition, while the other inputs to the (PG) gates are the negative potentials (−) applied thereto from the relevant line circuit when it is in a permanent-loop condition.

From the description given so far it will be evident that for each combined setting of the counter stages C and B any of the relevant group of ten (CG) gates and also any of the relevant group of ten corresponding (PG) gates will produce an output signal if the appropriate conditions are obtaining in their line circuits. In order to ensure that the output signals in respect of only one line circuit of the ten are effective at a time, the counter also includes ten pairs of coincidence gates (1)GY, (1)GY' . . . (10)GY, (10)GY' to which the output leads AL1–AL10 of the counter stage A are connected respectively. Also, the outputs of the first gates such as gate CG1 and CG1591 of all the 160 groups of ten calling gates are connected in common to the gate (1)GY, and the output leads of the tenth gates such as CG10 and CG1600 of these groups are connected in common to the gate (10)GY, the other gates (not shown) being likewise connected. Similar connections are also made between the (PG) gates and the ten gates (1)GY' . . . (10)GY'. Each pair of gates (1)GY, (1)GY' . . . (10)GY, (10)GY' corresponds to the pair of gates GY, GY' in FIG. 2 and the common symbols (160) between these gates and the gates PG and CG in FIG. 1 denote this commoning. Thus for each combined setting of the sixteen hundred possible which the three counter stages A, B and C can have (namely 16 x 10 x 10) a particular line circuit, different for each setting can produce an output signal on lead L1 or lead L2 (also in FIG. 2), or both these leads, if the previously described line conditions thereof obtain. Each combined setting of the counter stages C, B and A therefore uniquely identifies a particular line circuit. The gates G6 and G7 are those shown in FIG. 2*a*.

As regards the utilization of the combinations of marking signals identifying line circuits, it will be assumed by way of example that line circuits according to the invention are employed in an automatic exchange system the switching ranks of which are arranged in the manner shown in diagrammatic form in FIG. 5. This figure shows the connection between three such switching ranks A, B and C, each consisting of an assemblage of coordinate switching arrays, preferably but not necessarily, constituted by cross-point arrays using reed relays. Each of the arrays in the three switching ranks A, B and C is shown in a schematic fashion as a matrix of horizontal and vertical lines, each of which represents a multiple conductor connection. Each switching array, by means of some suitable form of switching means, for instance reed relays, at the cross-points between vertical and horizontal connection, affords selective access between a set of such connections on one side and another set on the other side. The switching arrays of the A rank are those which would be provided as primary switches affording access to 1600 subscribers' line circuits. These switching arrays can therefore be said to constitute a switching unit of which there would be several according to the number of lines connected to the exchange. As aforesaid an individual scanning circuit arrangement such as that shown in FIG. 2–2*a* would be provided for each such unit. In the example given the switching unit of rank A is divided into sixteen switching groups GP1–GP16 each comprising ten switching arrays. To keep the drawing as open as possible only the first, second and tenth switching arrays and only the first, second and last switching groups have been shown. There are thus a total of 160 switching arrays (A1–A160) each serving a sub-group of ten of the 1600 lines L1–L1600 connected to the switching unit. The ten lines of each sub-group are connected to respective verticals of the appertaining switching array. In the switching rank B sixteen switching arrays B1–B16 are provided, one in respect of each of the switching groups GP1–GP16 in the switching rank A. The horizontal connections in each of these B rank switching arrays correspond in number (10) to the number of switching arrays (10) in each of the switching groups GP1–GP16 of the A rank. The (AB) connections from the A rank switching arrays, typified by connections AB1, AB2 and AB10 of each array, extend to the respective B rank switching arrays. All the AB1 connections go from the first horizontal in the A switching arrays to the first horizontal in the B switching arrays, all the AB2 connections go from the first horizontal in the A switching arrays to the second horizontal in the B switching arrays, and so on, with the AB10 connections going from the first horizontal in the tenth A switching array of each group to the tenth horizontal of the relevant B switching array. The other horizontals (unreferenced) of the A switching arrays extend in similar fashion to respective further groups of B switching arrays.

The B and C rank switching arrays are cross-connected with each other such that each B array has access to all the C arrays. To this end there are ten C arrays C1–C10 and each B array has the same number of verticals as there are C arrays, while the number of horizontals in each C array corresponds to the number (16) of B arrays. Here again, BC interconnections between the B and C rank switching arrays are organized in an orderly fashion: in particular, corresponding horizontals in the several C arrays all go to the same B array and corresponding verticals in the several B arrays all go to the same C array. Thus for example, the array C1 has its sixteen horizontals connected respectively to the sixteen B arrays over respective connections (1)BC1, (2)BC1 . . . (16)BC1, while the B1 array has its ten verticals connected respectively to the ten C arrays over respective connections (1)BC1 . . . (10)BC1. The verticals of each C array (assumed also to be 10 in number) are connected to respective registers, there being therefore a total of 100 registers R1 . . . R100 which can serve the sixteen hundred lines L1 . . . L1600.

Consider now the detection and selection of a particular path from a calling line to a register.

When a line calls its calling condition is detected, in the manner already described, and the circuit CC (FIG. 2) provides signals identifying the calling line. It will be remembered that the counter stage C of the circuit CC provides 16 different signal combinations, and each of the counter stages B and A 10 different signal combinations. Thus the 16 different signal combinations from the counter stage C may pertain respectively to the corresponding horizontals of the several C arrays, so that the occurrence of a signal combination from the counter stage C will effectively cause the selection of a B array, the ten different signal combinations from the counter stage B may pertain respectively to the corresponding horizontals of the several B arrays so that the occurrence of a signal combination from the counter stage B will effectively cause the selection of ten A arrays one in each group thereof, but the previously selected B array reduces this to only a single A array, while the occurrence of a signal combination from the counter stage A will effectively cause the selection of 160 verticals, one in each A array, but the previously selected A array reduces this to only a single vertical and therefore the line circuit connected to it. Thus the marking signals from the circuit CC identifying a calling line are effective for selecting a path through the A, B and C switching ranks to a register, and may thus be utilized without translation for bringing about the operation of the relevant cross-points whereby to establish this path.

The logic elements shown in FIGS. 2 to 4 may take any suitable known form. For example, the stages of the counter CC, and the bistable elements such as Be1, may each be bistable transistor circuits comprising a pair of transistors having their bases and collectors cross-coupled in known fashion, the impulse generators such as IG1 may also be transistor circuits each comprising a pair of transistors having their bases and collectors capacitively cross-coupled to form multivibrators, while the various coincidence gates may be pulse-plus-bias or transistor gating circuits. The beginning and end elements such as BE1 and EE1 may be simple transistor inverter circuits so arranged as to provide the correct polarity of pulse either at the beginning or at the end, as the case may be, of a pulse applied thereto. Such an inverter circuit may have a capacitance-resistance differentiating input which produces "spike" pulses of opposite polarity at the leading and trailing edges respectively of an applied pulse. One or other of the "spike" pulses, according as the inverter functions as a beginning or as an end element, would then be utilized for rendering the inverter transistor conductive to produce a "beginning" or an "end" output pulse. Alternatively, in the case of an end element, two monostable circuits each comprising two cross-coupled transistors may be provided in cascade, an input pulse being applied to one such circuit and a resulting output pulse being produced by the other after a delay determined by the turnover time of the circuits. All these forms of circuits are well known in the art and it is therefore not necessary to include details of them in the drawings.

What I claim is:

1. An automatic telecommunication switching system including a primary switching stage, a plurality of line circuits for respective lines connected to the primary switching stage, resistances in each of said line circuits connected to present a starting potential in response to a calling condition of the pertinent line, means responsive to such starting potential for initiating setting of a primary switch of said primary switching stage appropriately to the particular calling line, and a two-step cut-off relay in each line circuit, said relay connected to be fully operated in response to an operating condition extended thereto over a primary switch set as aforesaid and having contacts connected for disconnecting said resistances when fully operated and further contacts connected for preparing on operation of the relay a local holding circuit therefor independent of the set primary switch, and still further contacts connected for establishing the prepared holding circuit on removal of said operating condition from the operated cut-off relay without replacement by a releasing condition from the primary switch consequent upon a permanent-calling condition of the line to cause only partial release of the relay to a partially operated condition in which its said contacts complete said holding circuit for the relay to maintain the relay partially operated and cause the production of a potential indicative of the permanent-calling condition.

2. An automatic telecommunication switching system as claimed in claim 1, wherein each said line circuit includes a pair of coincidence gates connected respectively to receive as priming signals said starting and permanent-calling potentials as produced by the line circuit, and wherein said means responsive to the starting potential is a scanning circuit arrangement which is common to all the line circuits and has connections thereto for applying concurrently to both coincidence gates of each of the several line circuits in turn an interrogating signal, any primed gate being responsive to such interrogating signal to produce an output signal signifying a detected line, the scanning circuit arrangement also including means responsive to an output signal from either gate of a pair, but not from both gates, to produce marking signals which identify the line thus detected, and also to provide marking signals indicative of which gate of the pair produced the output signal.

References Cited by the Examiner

UNITED STATES PATENTS

| | | | |
|---|---|---|---|
| 2,293,588 | 4/1941 | Cain et al. | 179—175.21 |
| 2,563,589 | 8/1951 | Hertoz | 179—18 |
| 2,724,018 | 11/1955 | Pouliart et al. | 179—18 |
| 3,037,085 | 5/1962 | Lowry | 179—27.54 |
| 3,086,084 | 4/1963 | Brook et al. | 179—175.21 |

FOREIGN PATENTS

| | | |
|---|---|---|
| 483,525 | 4/1938 | Great Britain. |

ROBERT H. ROSE, *Primary Examiner.*